United States Patent [19]
Barber

[11] Patent Number: 5,935,699
[45] Date of Patent: Aug. 10, 1999

[54] LIGHTWEIGHT COMPOSITE MATERIAL COMPRISING HOLLOW CERAMIC MICROSPHERES

[76] Inventor: Robert Frederick Barber, 124 Northern Road, West Heidelberg, Victoria, Australia, 3081

[21] Appl. No.: 08/912,311

[22] Filed: Dec. 20, 1996

[51] Int. Cl.[6] ............................................. B32B 5/16
[52] U.S. Cl. .................. 428/325; 428/328; 428/331; 428/498; 428/703
[58] Field of Search ..................... 428/323, 331, 428/498, 703, 325, 328

[56] References Cited

U.S. PATENT DOCUMENTS

| | | | |
|---|---|---|---|
| 4,780,141 | 10/1988 | Double et al. | 106/38.3 |
| 5,106,557 | 4/1992 | Rirsch et al. | 264/118 |
| 5,229,437 | 7/1993 | Knight | 523/219 |
| 5,234,754 | 8/1993 | Bache | 428/332 |
| 5,252,526 | 10/1993 | Whittemore | 501/127 |
| 5,358,676 | 10/1994 | Jennings et al. | 264/71 |
| 5,443,603 | 8/1995 | Kirkendall | 51/296 |
| 5,631,097 | 5/1997 | Andersen et al. | 428/703 |

*Primary Examiner*—Hoa T. Le
*Attorney, Agent, or Firm*—Flehr Hohbach Test Albritton & Herbert LLP

[57] ABSTRACT

The present invention relates to a lightweight composite material comprising:

(a) hollow ceramic microspheres;
(b) cement;
(c) concrete admixture or additive; and
(d) water.

The invention also relates to a process for preparing the lightweight composite material and construction products, concrete furniture or art objects wholly or partly composed of the lightweight composite material.

14 Claims, No Drawings

LIGHTWEIGHT COMPOSITE MATERIAL COMPRISING HOLLOW CERAMIC MICROSPHERES

The present invention relates to a lightweight composite material and a process for its preparation, in particular a lightweight composite material for use in forming construction products.

BACKGROUND OF THE INVENTION

Properly designed and processed concrete is a dense, hard, strong and durable construction material. These properties result in concrete having an extremely heavy weight. It is often difficult and costly therefore to transport and install pre-cast concrete products.

A requirement accordingly exists for a material which is hard, strong and durable like concrete, but which has a light weight per unit volume.

SUMMARY OF THE INVENTION

According to the present invention there is provided a lightweight composite material comprising:
(a) hollow ceramic microspheres;
(b) cement;
(c) concrete admixture or additive; and
(d) water.

DETAILED DESCRIPTION OF THE INVENTION

The hollow ceramic microspheres are generally composed of silica and alumina as the major components and iron oxide and titanium dioxide as the minor components. The high alumina and low iron oxide content results in the microspheres having a high melting point usually in the range of about 1600 to about 1800° C. The high melting point enables the microspheres to be nonabsorbent, nonflammable, possess high chemical resistance and in combination with the vacuum in the spheres provide both thermal and acoustic insulation.

The nominal particle size of the microspheres may be in the range of about 12 to about 310 microns. Preferably, the microspheres have a specific gravity (or true density) of about 0.7 g/cc and a bulk density of about 0.4 g/cc.

The ceramic shell of each microsphere is advantageously about 10% of its diameter. The shell is remarkably strong, hard, dense, resistant to abrasion/chemicals and provides excellent resistance to planar shear as well as crush resistance. Mercury porisimetry isostatic test data indicates that the ceramic microspheres will usually withstand up to about 10,000 psi with a volume loss of about 50%.

The high hardness, impact and compressive strength of the microspheres enables them to withstand the rigours associated with blending, mixing and processing so that densities of the composite formulation are maintained following any processing application.

Another major advantage of the microspheres is their light weight for a given volume. The microspheres function to reduce the density or weight of the composite material of the present invention while maintaining its integrity and strength.

The microspheres are generally present in an amount of about 5 to about 70% by weight of the composite material.

An example of a suitable microsphere for use in the present invention is MICROCELLS. The typical formulation of MICROCELLS is as follows:

Silica (as $SiO_2$) 55.0%;
Alumina (as $Al_2O_3$) 43.2%;
Iron oxide (as $Fe_2O_3$) 0.5%,
Titanium dioxide (as $TiO_2$) 1.2%; and
Moisture 0.1%.

A particularly preferred microsphere is MICROCELLS SLG which has the above formulation and a nominal particle size in the range of about 12 to about 300 microns (mean particle size of about 130 microns).

The term "cement" is used herein in its broadest sense and includes aluminous cement, Sorel's, magnesium oxychloride cement and any binding substance after hydration containing calcium silicates and aluminates. Suitable cements may include Portland cement, High Alumina cement and ground granulated blast furnace slag cement. The cement is usually present in an amount of 20 to 80% by weight of the composite material.

The admixture or additive may be of any suitable type used in the concrete art, such as, for example, superpolymer admixture, superplasticizer admixture, set retarding admixture, set accelerating admixture, permeability reducing admixture, set retarding water reducing admixture, air entraining admixture, pigments, extenders, fillers, binders, adhesives, sealants, coatings, aggregates, dispersing agents, abrasives, processing aids, gaseous density reducing admixtures or mixtures thereof. The admixture or additive is generally present in an amount of 0.1 to 30% by weight of the composite material.

In a preferred embodiment, the composite material contains a superpolymer admixture which increases the flexural, tensile and shear bond strength and a superplasticizer or high range water reducing admixture which reduces the water content thereby increasing the mechanical strength.

Thus, the present invention also provides a lightweight composite material comprising:
(a) hollow ceramic microspheres;
(b) cement;
(c) superpolymer admixture;
(d) superplasticizer admixture; and
(e) water.

The superpolymer admixture is preferably acrylic based and improves the adhesion, impact strength and abrasion resistance of the composite material as well as the flexural, tensile and shear bond strength. A suitable superpolymer admixture is a modified spray dried acrylic emulsion latex polymer manufactured under the trademark ABIL-STRENGTH by the present inventor.

The superplasticizer admixture is preferably based on a high molecular weight polymer resin. This admixture reduces the water/cement ratio which means that the mechanical strength and wear and weathering resistance of the composite material when hardened is increased and shrinkage which causes cracking is reduced. An example of a superplasticizer admixture is COSMOTRON (Registered Trade Mark) DPU-AC manufactured by the present applicant which is a sodium salt of a high molecular weight formaldehyde condensate of naphthalene sulphonic acid.

When used in combination, the superpolymer and superplasticizer admixtures result in the composite material having an increased compressive strength.

In another preferred embodiment, the composite material also contains a pigment which provides a permanent integral colour even when exposed to UV light and weather.

Thus, the present invention further provides a lightweight composite material comprising:

(a) hollow ceramic microspheres;

(b) cement;

(c) superpolymer admixture;

(d) superplasticizer admixture;

(e) pigment; and (f) water.

The pigment may be white or coloured and have a matt or glossy multichromatic broken colour or pearlescent finish. An example of a white pigment is rutile titanium dioxide such as ABILOX (Registered Trade Mark) ILLUMIN-ITE WHITE manufactured by the present applicant. The coloured pigment is generally a mineral oxide, such as, a transition metal oxide, for example, ABILOX (Registered Trade Mark) MINERAL OXIDE PIGMENTS manufactured by the present applicant. The colours may include but are not limited to black, brown, tan, beige, marigold, terra cotta, red, cinnamon, yellow, green, blue and grey. The pigment is generally present in an amount of about 0.5 to about 6% by weight of the composite material.

The balance of the composite material is water of hydration which is usually present in an amount of about 24 to about 55% by weight. It will be appreciated that it is preferable to keep the water content low so as to optimize the amount of mechanical strength, as well as the hardness and abrasion resistance of the composite material.

A particularly preferred composite material according to the present invention comprises:

(a) about 25 to about 40% by weight of hollow ceramic microspheres;

(b) about 40 to about 60% by weight of cement;

(c) about 1 to about 12% by weight of superpolymer admixture;

(d) about 0.3 to about 0.6% by weight of superplasticizer admixture;

(e) about 0.5 to about 6% by weight of pigment; and (f) about 24 to about 48% by weight of water based on the total weight of the composite material.

This particularly preferred material is capable of having a compressive strength of 28 MPa at 28 days after curing.

The composite material is usually prepared by mixing the ingredients together. The mixing may be conducted in any suitable apparatus which can achieve adequate blending and dispersion of the ingredients in the shortest time, for example, a high shear cement mixer.

A preferred process involves adding the ingredients in the following specific sequence to water contained in a suitable mixing apparatus:

(1) hollow ceramic microspheres;

(2) cement;

(3) concrete admixture or additive; and (4) optionally pigment.

The superpolymer admixture is generally added before the superplasticizer admixture.

These ingredients may also be provided in the form of a kit with appropriate instructions to use.

According to another aspect of the present invention there is provided a kit adapted to facilitate the mixing of ingredients (1) to (4) above to provide a composite material, said ingredients being held in said kit apart.

Alternatively, the composite material may be provided as a formulation of ingredients (1) to (4) above which then requires mixing with water.

Thus, the present invention further provides a lightweight composite material formulation which comprises:

(1) hollow ceramic microspheres;

(2) cement;

(3) concrete admixture or additive; and (4) optionally pigment.

The composite material can be moulded or extruded into any shape, cast into thin or thick slabs, batts, panels, pavers, bricks and tiles, trowel applied as insulative renders, plasters or thin protective and decorative coati for many types of structures or used as a self-levelling flooring compound or adhesive.

The composite material may be used to form construction products such as architectural building components and highway noise abatement panels or other sound deadening and thermally insulating construction materials, concrete furniture or art objects. It can also be used as a replacement for fibreglass and other reinforced plastic composite products or as an ambient temperature hardened replacement for baked clay pottery and other ceramic products.

The composite material may be cured by a process involving the prevention of the evaporation of the mixing water using a suitable curing agent which may be applied by spraying, brushing or brooming. Examples of curing agents are suitably formulated chlorinated rubber, acrylic rubber or polyvinylidene chloride polymer liquids such as DURO-SEEL manufactured by the present applicant. When cured, the composite material possesses an attractive surface colour and finish and a high mechanical strength.

The invention will now be described with reference to the following nonlimiting examples.

EXAMPLE 1

The following ingredients were added to an efficient mixer in the sequence:

(1) about 1 part by volume of clean water at 25° C. (288 l/m$^3$).

(2) about 2 parts by volume of MICROCELLS SLG strong, white, hollow ceramic microspheres (lightweight aggregates: 275 kg/m$^3$).

(3) about 2 parts by volume of fresh off-white Portland cement type HE (ASTM type II) (622 kg/m$^3$).

(4) about ⅕ parts by volume of ABILOX (Registered Trade Mark) ILLUMIN-ITE WHITE OXIDE PIGMENT or any other ABILOX UV resistant mineral (metal) oxide pigment colour e.g., ABILOX black iron oxide CAF X2 (62 kg/m$^3$).

(5) about ¼ part by volume of ABIL-STRENGTH flexural and tensile strength-increasing, adhesion promoting superpolymer powder admixture (48 kg=7.7% w/w cement).

(6) about 1/20 part by volume of COSMOTRON (Registered Trade Mark) DPU-AC superplasticizer powder (31.1 kg/m$^3$).

The indicated amount of water was added to the mixer followed by the MICROCELLS and the cement and mixed well. The colour pigment was then added and mixed for 10 minutes. ABIL-STRENGTH was added followed by COSMOTRON (Registered Trade Mark) DPU-AC. All the ingredients were mixed for at least a further 15 minutes until the mixture was fluid. The high slump, highly workable mixture was then cast into moulds and compacted by vibration to remove air voids so as to maintain the density and potential strength of the cement paste.

One coat of DURO-SEEL liquid curing compound was applied by spray, brush or broom to all surfaces of the composite material exposed to air at the coverage rate of 5 m²/l. DURO-SEEL and the curing process retains the mixing water over an extended period of time—preventing it from evaporating and allowing it to all chemically hydrate with the cement to form the strongest of glues to bind the material together and maintain the highest mechanical strength properties.

The moulds filled with the composite material were stored at a temperature of 25° C. and a minimum Relative Humidity of 70% for 3 days. The set and partially hardened composite product was then demoulded and coated with 2 coats of DURO-SEEL at an average coverage rate of 7 m²/l.

EXAMPLE 2

The same procedure as set out in Example 1 was followed except that the following ingredients were added to an efficient mixer in the sequence:

(1) about 1 part by volume of clean water at 25° C. (288 l/m³).
(2) about 2 parts by volume of MICROCELLS SLG strong, white, hollow ceramic microspheres (lightweight aggregates: 275 kg/m³).
(3) about 2 parts by volume of white High Alumina cement (662 kg/m³).
(4) about ⅕ parts by volume of ABILOX (Registered Trade Mark) ILLUMIN-ITE WHITE OXIDE PIGMENT or any other ABILOX UV resistant mineral (metal) oxide pigment colour e.g., black (62 kg/m³).
(5) about ¼ part by volume of ABIL-STRENGTH flexural and tensile strength-increasing, adhesion promoting superpolymer powder admit (48 kg=7.7% w/w cement).
(6) about ¹⁄₂₀ part by volume of COSMOTRON (Registered Trade Mark) DPU-AC superplasticizer powder (3 1.1 kg/m³).

The composite material of Example 2 possess the following advantages:

Maximum mechanical strength is achieved in about 72 hours at a composite temperature of 20° C.

There is virtually no shrinkage.

Exceptionally high chemical resistance e.g., to salt spray in marine environments and to sulphate laden ground waters.

High resistance to elevated temperatures.

High abrasion and wear resistance.

What is claimed is:

1. A lightweight composite material comprising hollow ceramic microspheres, cement, concrete admixture or additive, and water; wherein the hollow ceramic microspheres are comprised of silica and alumina as the major components and iron oxide and titanium dioxide as the minor components.

2. A lightweight composite material as claimed in claim 1 wherein the hollow ceramic microspheres comprised by weight:

Silica (as $SiO_2$) 55.0%;

Alumina (as $Al_2O_3$) 43.2%,

Iron oxide (as $Fe_2O_3$) 0.5%;

Titanium dioxide (as $TiO_2$) 1.2%; and

Moisture 0.1%

3. A lightweight composite material as claimed in claim 1 wherein the cement is portland cement, high alumina cement or ground granulated blast furnace slag cement.

4. A lightweight composite material as claimed in claim 1 wherein the concrete admixture or additive is polymer admixture, superplasticizer admixture, set retarding admixture, set accelerating admixture, permeability reducing admixture, set retarding water reducing admixture, air entraining admixture, pigments, extenders, fillers, binders, adhesives, sealants, coatings, aggregates, dispersing agents, abrasives, processing aids, gaseous density reducing admixtures or mixtures thereof.

5. A lightweight composite material comprising: hollow ceramic microspheres, cement, polymer admixture, superplasticizer admixture, and water; wherein the hollow ceramic microspheres are comprised of silica and alumina as the major components and iron oxide and titanium dioxide as the minor components.

6. A lightweight composite material as claimed in claim 5 wherein the polymer admixture is acrylic based.

7. A lightweight composite material as claimed in claim 5 wherein the superplasticizer admixture is based on a high molecular weight polymer resin.

8. A lightweight composite material as claimed in claim 7 wherein the superplasticizer admixture is a sodium salt of a high molecular weight formaldehyde concentrate of naphthalene sulphuric acid.

9. A lightweight composite material comprising: hollow ceramic microspheres, cement, polymer admixture, superplasticizer admixture, pigment, and water; wherein the hollow ceramic microspheres are comprised of silica and alumina as the major components and iron oxide and titanium dioxide as the minor components.

10. A lightweight composite material as claimed in claim 9 wherein the pigment is rutile titanium dioxide or a mineral oxide.

11. A lightweight composite material comprising: about 25 to about 40% by weight of hollow ceramic microspheres, about 40 to about 60% by weight of cement, about 1 to about 12% by weight of polymer admixture, about 0.3 to about 0.6% by weight of superplasticizer admixture, about 0.5 to about 16% by weight of pigment, and about 24 to about 48% by weight of water based on the total weight of the composite material; wherein the hollow ceramic microspheres are comprised of silica and alumina as the major components and iron oxide and titanium dioxide as the minor components.

12. A lightweight composite material formulation which comprises: hollow ceramic microspheres, cement, concrete admixture or additive, and optionally pigment; wherein the hollow ceramic microspheres are comprised of silica and alumina as the major components and iron oxide and titanium dioxide as the minor components.

13. A process for preparing a lightweight composite material comprising adding ingredients in the following specific sequence to water: hollow ceramic microspheres, cement, concrete admixture or additive, and optionally pigment and mixing after each addition; wherein the hollow ceramic microspheres are comprised of silica and alumina as the major components and iron oxide and titanium dioxide as the minor components.

14. A construction product, concrete furniture or art object which is wholly or partly composed of the lightweight composite material as defined in claims 1, 5, 9 or 11.

* * * * *